Patented Mar. 12, 1946

2,396,575

UNITED STATES PATENT OFFICE 2,396,575

PROCESS OF MAKING FLAME-RESISTANT RESINS

Henry J. Kauth, Schenectady, N. Y.

No Drawing. Application June 22, 1943, Serial No. 491,857

2 Claims. (Cl. 260—97)

This invention relates to flame-resisting resins which do not support combustion and which carbonize and swell to produce a thermal insulating mass when held in a flame or are otherwise heated to a high temperature.

The products of this invention have a wide field of usefulness, being soluble in various solvents, and compatible with many resins, plasticizers, oils, etc., to form fire-resisting coating materials or saturants. However, they are especially suitable as ingredients of dry, powdered fire fighting compounds because they can be easily ground to an impalpable powder which has no tendency to coalesce and lump and because when used in this way they swell enormously when in contact with a flame, producing a blanket which excludes air and which has unusually high thermal insulating value. They are particularly useful for fighting magnesium incendiary bombs.

It has been known for a long time that certain materials, notably the fatty acid pitches, will carbonize and swell when ignited. Such materials have been widely used as flame-proofing agents in roofing materials and the like, to provide flame-resistance in the finished articles. The products of this invention behave similarly but are much more effective and are less costly. They differ from the fatty acid pitches in that they do not support combustion, whereas, the pitches burn freely until the coke formed on their surface finally extinguishes them. Moreover, the carbonized mass formed from the products of this invention is thicker and has better heat insulating properties than the mass formed from the same amount of fatty acid pitch.

The products referred to here are chemical reaction products of Vinsol resin with boric acid. The Vinsol resins are by-products obtained in the reclamation and refining of "stump" rosin. Their exact chemical nature is not known, but there is some evidence that they are principally chemical reaction products of oxidized rosin and the degradation products of lignin. The Vinsol resins of this invention, and referred to in the claims are defined as the residual resins obtained by dissolving wood rosin in a gasoline type thinner, extracting the color bodies from the solution with a selective solvent such as furfural or phenol, immiscible with the gasoline type solvent, separating the selective solvent portion and recovering the volatile part of it to leave a residue of dark, fusible and combustible resin characterized by insolubility in aliphatic petroleum solids, and which melt and burn freely when ignited.

I have found that when these resins are heated to about 150° C. or higher with boric acid or its anhydride, a chemical reaction takes place. This is evidenced by a vigorous frothing and a sharp increase in viscosity during the reaction. After the reaction is completed the evolution of vapor subsides and the product becomes free from foam. The resulting resin no longer supports combustion, and when held in a flame it carbonizes and forms a voluminous mass.

Salts such as borax which contain boric acid anhydride when fused at a high temperature may be used in place of boric acid. Such salts are difficult to react with the Vinsol in a reaction kettle but are useful in dry admixture with powdered Vinsol for use in this form on fires where the heat of the fire promotes the reaction.

Boric acid has long been used as a flame-proofing material. It has even been used as an inert addition to resinous solutions, generally with the addition of inert pigments and has also been used to some extent in molten resins. However, in all these prior uses the boric acid is effective only because it melts at the temperature of the flame and forms a dense slag on the burning material.

I have also found that phosphoric acid or its anhydride reacts with the Vinsol resin but the reaction product in this case does not carbonize and swell to an appreciable extent when held in a flame, although it possesses the same inability to support combustion as the boric acid product. From 10% to 15% of syrupy phosphoric acid containing 85% $H_3PO_4$ gives good non-burning qualities to the reaction product. The reaction is induced by heating to 150° C. or higher as in the case of boric acid which will be described.

The present invention may be practiced in several ways as illustrated in the following examples:

Example 1

| | Parts by wt. |
|---|---|
| Vinsol resin | 100 |
| Boric acid ($H_3BO_3$) | 6 to 10 |

The Vinsol resin is melted and maintained at 150° C. or higher. The boric acid is then added in small portions, allowing the reaction to subside after each addition to prevent the foam from becoming unmanageable, until all of the boric acid has been added. A foam-beater type of stirrer facilitates the operation by controlling the thickness of the foam layer. After the reaction is completed and the evolution of vapor stops, the resin is poured out in shallow pans to cool, or if desired in solution, it may be thinned by the addition of solvents directly to the molten resin.

Example 2

To lessen the difficulty residing in the vigorous foaming during the reaction, the viscosity of the resin can reduced by the addition of high boil-plasticizer solvents, preferably those which are flame-resistant in themselves.

| | Parts by wt. |
|---|---|
| Vinsol resin | 100 |
| Tricresyl phosphate | 25 |
| Boric acid ($H_3BO_3$) | 6 to 10 |

The Vinsol resin and tricresyl phosphate are melted together and held at 150° C. or higher with constant stirring while the boric acid is added in small additions until all of the boric acid has been added and the reaction is completed.

Example 3

| | Parts by wt. |
|---|---|
| Vinsol resin | 100 |
| Boric acid ($H_3BO_3$) | 6 to 10 |

The Vinsol resin and the boric acid are mixed and ground to an impalpable powder. This powder is then placed in shallow pans and heated in ovens at 140°–150° C. to sinter the mass and to initiate the reaction. This requires from 20 to 30 minutes. The resin is then cooled and broken out of the pans.

Example 4

When used as a powdered ingredient of fire fighting compounds, it is not always necessary to react the materials before use. The reactants may be simply mixed in powdered form and the mixture applied to burning objects, the heat of the fire itself causing reaction of the powdered ingredients. This method is not preferred when inert extenders are added to the mixture, since intimate contact between the Vinsol resin and boric acid is partly lost by the addition of such extenders and some of the effectiveness is lost.

| | Parts by wt. |
|---|---|
| Vinsol resin | 100 |
| Boric acid ($H_3BO_3$) | 6 to 10 |

The Vinsol resin and boric acid are ground to a fine powder and are thoroughly mixed. When in contact with a fire, the powdered ingredients first react to form the new resinous compounds of this invention and these carbonize and swell, to smother and isolate the fire.

Example 5

The use of borax in place of boric acid may be conveniently made in the case of powdered fire fighting mixtures. The reactants are simply mixed in finely powdered condition. The mixture is applied to burning objects, the heat of the fire itself causing reaction of the powdered ingredients.

| | Parts by wt. |
|---|---|
| Vinsol resin | 100 |
| Borax | 10 to 20 |

The Vinsol resin and borax are ground to a fine powder and are thoroughly mixed.

In the above examples the proportions of boric acid are given as 6 to 10 parts by weight to each 100 parts by weight of Vinsol resin. Less than 6 parts could be used at a sacrifice of desirable properties. For example, if 3 parts by weight were used, the product would be equivalent to a mixture of equal parts of unreacted Vinsol with Vinsol which is combined with 6 parts of boric acid per 100 parts of resin. Likewise, more than 10 parts of boric acid could be used, but no additional benefit would be derived from the use of more than this amount of boric acid and the cost is increased thereby.

The Vinsol-boric acid reaction product can be used in many ways. It is soluble in various solvents such as aromatic hydrocarbons, alcohols, ketones, esters and chlorinated hydrocarbons. It is compatible with plasticizers and oils as well as with other resins and with film forming plastics. It is fusible at moderate temperatures and can be applied to various objects in the molten state, forming films on said objects which if later exposed to flame will carbonize and swell, producing a heat protective covering for the coated object, or heat insulation may be produced in situ on the coated object, at first instance, by subjecting the applied coating to the proper degree of heat to carbonize it and increase its volume. One of its principal uses is in dry, powdered compositions for fighting incendiary bombs. For this purpose it is more economical to mix the powdered product resin with some inert material such as sand, clay, talc or even ordinary loam. A typical example of such a mixture follows:

| | Parts by wt. |
|---|---|
| Vinsol-boric acid resin (powdered) | 1 |
| Sand | 5 to 10 |

This mixture is very effective for extinguishing incendiary bombs and at the same time protecting the surrounding area from the intense heat of the bomb.

The most effective way to use such a mixture is to shovel some over the bomb and to spread some out in a layer beside the bomb so that the bomb after being covered on top can be scooped up with a long-handled shovel and placed on the layer. The swelling of the resin raises the bomb off the floor and interposes a very effective insulation between it and the floor. The resin also prevents the sand or other inert material from erupting and thus provides a continuous blanket for excluding oxygen.

While I have in this invention described what I believe to be preferred and practical formulae for obtaining the desired product of the invention, it will be understood to those skilled in the art that these are not to be construed as limiting the scope of the invention which is defined in the appended claims.

What I claim as my invention is:

1. The process of making a flame resistant noncombustible composition of matter having the property of carbonizing into a greatly enlarged heat insulating mass comprising, dissolving pure stump resins in a gasoline-type solvent, extracting the color bodies from the solution with a selective solvent immiscible with the gasoline type solvent, separating the selective solution of color bodies from the gasoline type solution, removing residual solvent from the selected portion, and reacting the residual resins of said selected portion, in the presence of heat, with a substance selected from the group consisting of tetraborates, and boric acid.

2. The process as claimed in claim 1, the reaction being conducted at temperatures not substantially less than 140° C.

HENRY J. KAUTH.